(12) United States Patent
Renaud

(10) Patent No.: US 11,732,823 B2
(45) Date of Patent: Aug. 22, 2023

(54) FLUID DUCT

(71) Applicant: DUPONT POLYMERS, INC., Wilmington, DE (US)

(72) Inventor: Michel C. Renaud, Prangins (CH)

(73) Assignee: DuPont Polymers, Inc., Wilmington, DE (US)

( * ) Notice: Subject to any disclaimer, the term of this patent is extended or adjusted under 35 U.S.C. 154(b) by 0 days.

(21) Appl. No.: 17/558,218

(22) Filed: Dec. 21, 2021

(65) Prior Publication Data

US 2022/0112972 A1   Apr. 14, 2022

Related U.S. Application Data

(62) Division of application No. 17/042,457, filed as application No. PCT/US2019/024232 on Mar. 27, 2019.

(60) Provisional application No. 62/649,689, filed on Mar. 29, 2018.

(51) Int. Cl.
| | |
|---|---|
| *F16L 11/11* | (2006.01) |
| *F16L 11/12* | (2006.01) |
| *F02M 35/10* | (2006.01) |
| *F16L 11/15* | (2006.01) |

(52) U.S. Cl.
CPC ...... *F16L 11/111* (2013.01); *F02M 35/10137* (2013.01); *F16L 11/121* (2013.01); *F16L 11/15* (2013.01)

(58) Field of Classification Search
CPC ... F02M 35/10137; F16L 11/11; F16L 11/111; F16L 11/121; F16L 11/15; F16L 27/11
USPC .............. D23/266; 138/121, 122, DIG. 11
See application file for complete search history.

(56) References Cited

U.S. PATENT DOCUMENTS

| | | | | |
|---|---|---|---|---|
| 1,864,861 | A | * 6/1932 | Schaller | F16L 27/11 |
| | | | | 285/423 |
| 2,695,038 | A | * 11/1954 | Parce | H01B 11/1808 |
| | | | | 138/121 |
| 3,318,335 | A | * 5/1967 | Heller | F16K 41/106 |
| | | | | 138/121 |
| 3,345,590 | A | * 10/1967 | Wolfgang | H01P 3/14 |
| | | | | 138/122 |
| 5,435,962 | A | * 7/1995 | Kramer, Jr. | F16L 11/11 |
| | | | | 264/507 |

(Continued)

FOREIGN PATENT DOCUMENTS

| | | | | |
|---|---|---|---|---|
| EP | 2662606 A1 | * 11/2013 | ............. | F16L 11/15 |
| GB | 1220975 A | * 1/1971 | ............. | F16L 57/00 |

(Continued)

*Primary Examiner* — Robert K Arundale
*Assistant Examiner* — Richard K. Durden
(74) *Attorney, Agent, or Firm* — Dority & Manning, P.A.

(57) ABSTRACT

Provided herein is a fluid duct 2 comprising a tubular base wall 11 surrounding a duct channel and at least one bellows 10 formed along a section of the tubular base wall 11. The bellows 10 comprises a plurality of convolutes 12 having a profile 14 projecting radially from the base wall 11. At least one convolute 12 wraps around the duct channel at a wrap-around angle $\Omega$ of between 180° and 720° from a first end 22a to a second end 22b of the convolute 12, said second end 22b being offset in a flow direction F parallel to a centerline C of the duct channel by a non-zero offset distance D from the first end 22a.

13 Claims, 7 Drawing Sheets

(56) References Cited

U.S. PATENT DOCUMENTS

| | | | | |
|---|---|---|---|---|
| 6,056,018 | A * | 5/2000 | Renaud | F16L 11/111 138/121 |
| 6,102,078 | A * | 8/2000 | Kramer, Jr. | F16L 11/11 138/121 |
| 6,123,113 | A * | 9/2000 | Pontbriand | F16L 11/11 138/119 |
| 7,132,141 | B2 | 11/2006 | Thullen et al. | |
| 7,147,007 | B2 * | 12/2006 | Renaud | B60H 1/00557 138/119 |
| 9,551,442 | B2 * | 1/2017 | Kim | F16L 11/14 |
| 2002/0062873 | A1 * | 5/2002 | Nakagawa | F02M 35/10295 138/121 |
| 2002/0088500 | A1 * | 7/2002 | Turner | F16L 11/15 138/121 |
| 2003/0232207 | A1 * | 12/2003 | Thullen | F16L 11/118 428/476.3 |
| 2010/0037972 | A1 * | 2/2010 | Palmeri | F16L 11/11 138/121 |
| 2014/0130929 | A1 * | 5/2014 | Elliott | F16L 11/111 138/121 |
| 2022/0221088 | A1 * | 7/2022 | Kintea | F16L 11/111 |

FOREIGN PATENT DOCUMENTS

| | | | |
|---|---|---|---|
| JP | S 5258822 U | 4/1977 | |
| JP | S5362219 A | 6/1978 | |
| JP | H 06337084 A | 12/1994 | |
| WO | WO-03087647 A1 * | 10/2003 | F16L 11/15 |

* cited by examiner

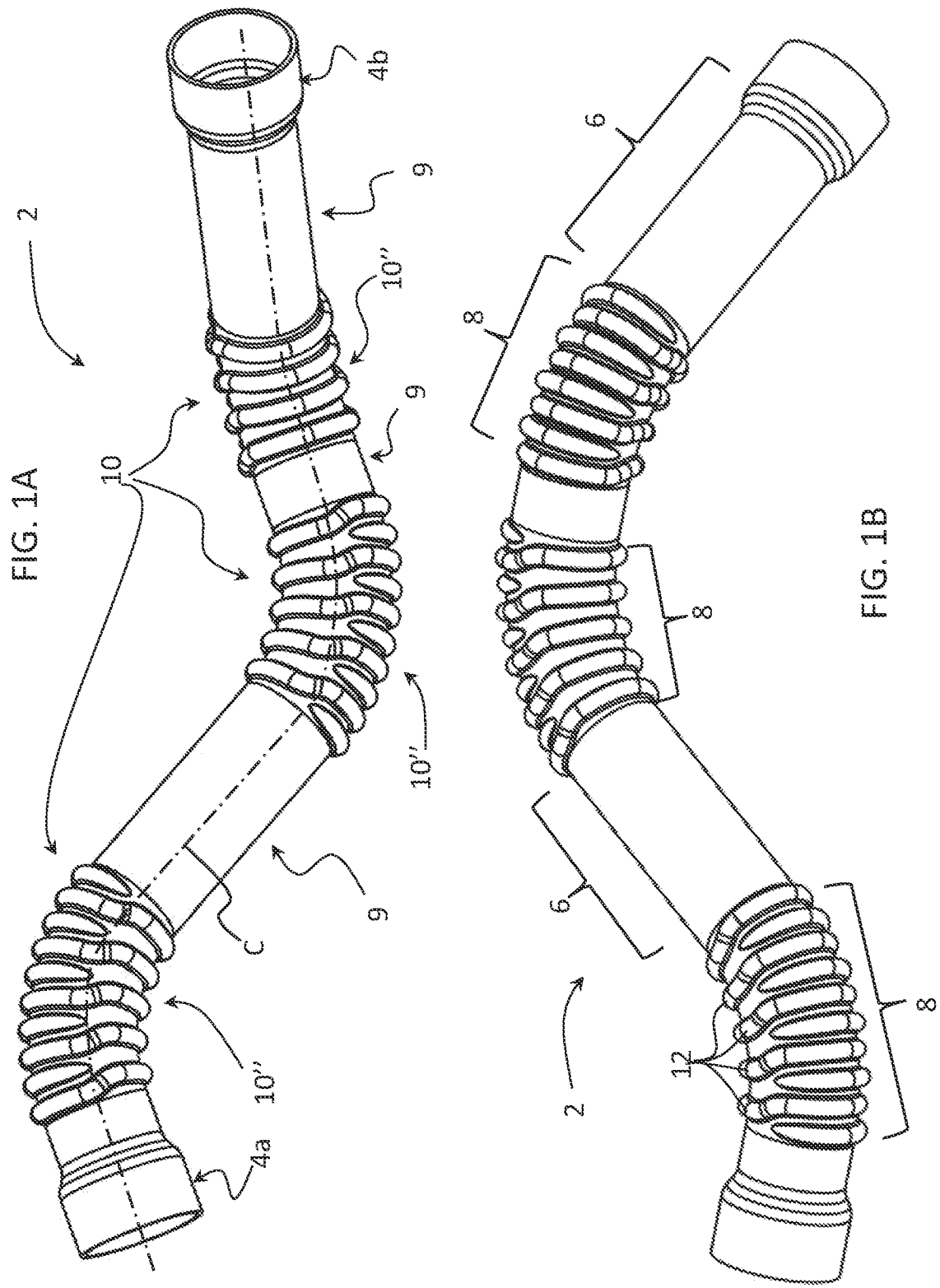

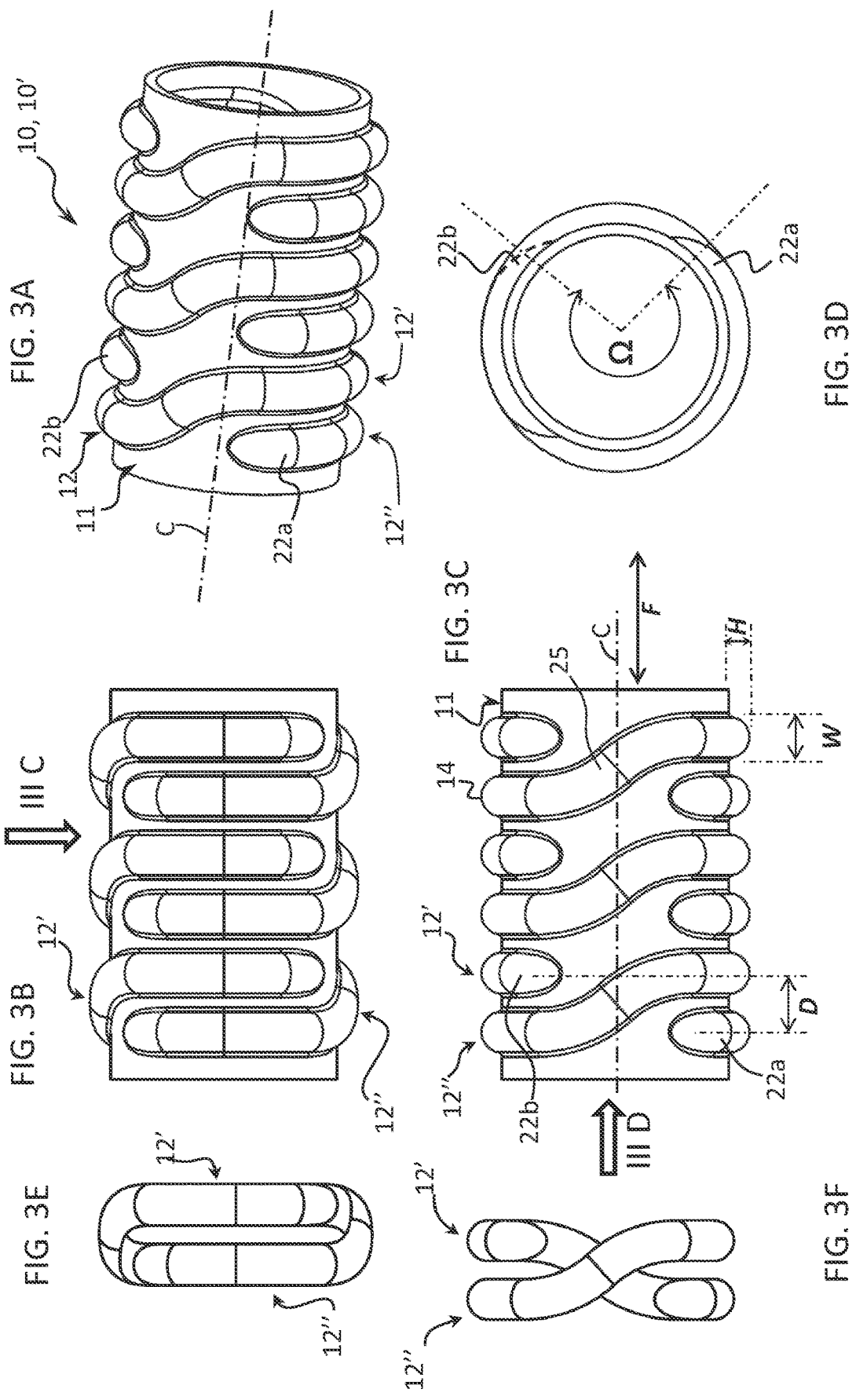

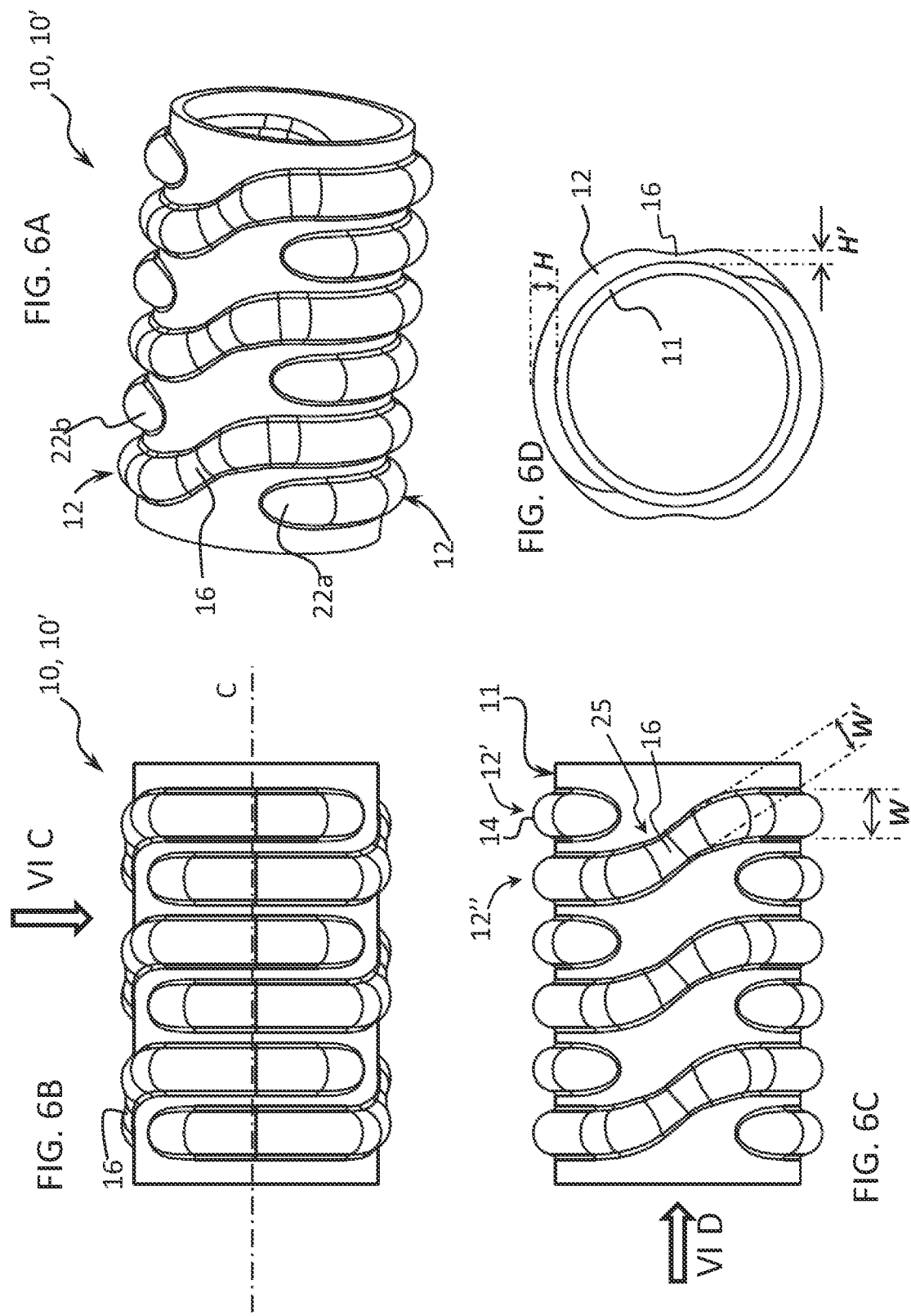

FLUID DUCT

CROSS-REFERENCES TO RELATED APPLICATIONS

This application claims priority under 35 U.S.C. § 120 as a division of U.S. application Ser. No. 17/042,457, filed on Sep. 28, 2020, which in turn claims priority under 35 U.S.C. §§ 365 and 371 to International Application No. PCT/US2019/024232, filed on Mar. 27, 2019, which in turn claims priority to U.S. Provisional Appln. No. 62/649,689, filed on Mar. 29, 2019, each of which is incorporated herein by reference in its entirety.

FIELD OF THE INVENTION

The present invention relates to flexible fluid duct. The invention relates in particular to a fluid duct made of or comprising a polymer material. The fluid duct may be used for instance in automotive applications.

BACKGROUND OF THE INVENTION

Fluid ducts for use in automotive applications may be used for the flow of air, as air ducts, for the flow of liquid or gaseous fuels, and other substances. In certain applications, the duct should withstand temperatures that may exceed 200° C. and relative pressures inside the tube may be up to 3 bars.

A flexible blow molded polymer tube for automotive applications is described in EP1295062. The flexible tube comprises bellows to provide some bending flexibility in the tube. The bending flexibility reduces stresses on the tube and on the coupling of the tube ends to motor components due to thermal and mechanical loads. Bellows that provide a high bending flexibility however also introduce flexibility in the tube in the flow direction. Under high temperatures and pressures, as found for instance in ducts used in an engine compartment for gas flow from a turbo charger, problems associated with elongation of bellows in flexible tubes are enhanced. To overcome these problems, conventional bellows are provided with sections that are substantially rigid in the flow direction, for instance by providing convolutes that do not completely encircle the tube, or by molding a rib extending in the flow direction that stiffens the tube in the flow direction. Such measures however reduce the bending flexibility in directions either side of the plane in which bending flexibility is maximum. Due to the various thermal and mechanical forces acting upon ducts found in an engine compartment, the reduced flexibility of the tube out of the plane of maximum flexibility can induce stresses within the flexible tube or at the coupling ends that may lead to rupture, detachment or permanent deformation. Moreover, the reduced out-of-plane bending flexibility caused by the tube rigidifying portions also generally increases the rigidity of the overall duct and thus renders the assembly thereof to complementary coupling elements more difficult. Ease of assembly and disassembly of the duct, for instance in an engine compartment, is another important factor.

For cost, design, layout and weight reasons, fluid ducts are typically made of a blow molded polymer material. The flexible tube and in particular bellows must in such cases also be configured for easy forming in a blow molding mold cavity in particular allowing easy release of the blow molded component from the mold cavity. This leads to certain constraints on the shape and position of the bellows and in particular the convolutes and rigidifying sections.

SUMMARY OF THE INVENTION

In view of the foregoing, it is an object of this invention to provide a fluid duct that is cost effective to produce and that has a high combined factor of stiffness in the flow direction and bending flexibility.

It is advantageous to provide a fluid duct that has a high bending flexibility in a large range of angles.

It is advantageous to provide a fluid duct that may be made from a blow molded polymer material.

It is advantageous to provide a fluid duct that can be made with versatile shapes and is both compact and robust.

It is advantageous to provide a fluid duct that reduces assembly forces during mounting to components and that reduces stresses during use on coupling ends and within the duct.

It is advantageous to provide a fluid duct made of or comprising principally a polymer material, that can withstand relative pressures around 2 to 4 bars and temperatures of up to 250° C. without permanent deformation.

It would be advantageous to provide a gas duct that is easy to assemble, while being strong and durable.

One or more objects of this invention have been achieved by providing the fluid duct according to claim 1.

Disclosed herein is a fluid duct comprising a tubular base wall surrounding a duct channel and at least one bellows formed along a section of the tubular base wall, the bellows comprising a plurality of convolutes having a profile projecting radially from the base wall. One or more, or all of said plurality of convolutes each wraps around the duct channel between 180° and 720° from a first end to a second end, said second end being offset in a flow direction (F) parallel to a centerline (C) of the duct channel by a non-zero offset distance (D) from the first end.

In an advantageous embodiment, the fluid duct comprises a plurality of bellows with at least two bellows interconnected by at least one non-bellows tube portion without bellows.

In an advantageous embodiment, the fluid duct comprises at least one bellows comprising convolutes that wrap around the tubular section by a wrap-around angle ($\Omega$) between 180° and 360°, said convolutes being arranged in pairs of convolutes that interleave such that the convolutes of the pair wind around the duct channel in opposite winding directions.

In an embodiment, the wrap-around angle ($\Omega$) is in a range of 200° to 340°.

In an advantageous embodiment, said at least one bellows comprising interleaving pairs of convolutes is on a straight or substantially straight section of fluid duct.

In an advantageous embodiment, at least one bellows comprises a plurality of convolutes that wrap around the duct channel by a wrap-around angle between 360° and 720°.

In an embodiment, the wrap-around angle ($\Omega$) is in a range of 380° to 560°.

In an embodiment, the bellows is provided on a bent section of fluid duct wherein the convolutes are oriented such that overlapping end portions of each convolute are provided on an outer radius of the bent section.

In an advantageous embodiment, said convolutes of said at least one bellows are arranged in a juxtaposed manner.

In an embodiment, ends of the juxtaposed convolutes are substantially aligned along a virtual line that is substantially parallel to a centerline of the bellows.

In an embodiment, juxtaposed convolutes are arranged in a manner rotated one with respect to the other around a centerline of the bellows.

In an advantageous embodiment, a plurality of convolutes are each provided with at least one narrowing taper having an axial width (W') and/or radial height (H') that is smaller than a width (W) and/or radial height (H) respectively of a major length of the convolute.

In an advantageous embodiment, said narrowing taper is arranged in an oblique section of the convolute, as depicted in FIGS. 7A through 7D.

In an embodiment, the narrowing taper is provided adjacent to an end of the convolute, as depicted in FIGS. 4A through 4D, for example.

In an embodiment, the narrowing taper section is provided midway between ends of the convolute, as depicted in FIGS. 6A through 6D.

In an advantageous embodiment, the profile of a plurality of said convolutes is convex and protrudes radially outwardly from the tubular base wall.

According to an aspect of the invention, the fluid duct is for use as a fluid duct in an automotive engine compartment.

In an advantageous embodiment, the fluid duct is a blow molded or extruded polymer component.

The advantages and features of novelty that characterize the invention are pointed out with particularity in the claims annexed hereto and forming a part hereof. For a better understanding of the invention, its advantages, and the objects obtained by its use, however, reference should be made to the drawings which form a further part hereof, and to the accompanying descriptive matter, in which there is illustrated and described one or more preferred embodiments of the invention.

BRIEF DESCRIPTION OF THE DRAWINGS

The invention will now be described with reference to the accompanying drawings, which by way of example illustrate the present invention and in which:

FIGS. 1A and 1B are perspective views of an example of a fluid duct according to an embodiment of the invention;

FIG. 3A is a perspective view of a bellows of a fluid duct according to an embodiment of the invention;

FIG. 3B is a side view of the embodiment of FIG. 3A;

FIG. 3C is a view in the direction of arrow III C of FIG. 3B;

FIG. 3D is a view in the direction of arrow III D of FIG. 3C;

FIG. 3E and 3F illustrates the shape of a convolute of the bellows of FIGS. 3C and 3D respectively;

FIGS. 6A to 6D are similar to FIGS. 3A to 3D, showing yet another embodiment of the invention;

DETAILED DESCRIPTION OF EMBODIMENTS OF THE INVENTION

Figure 2A:
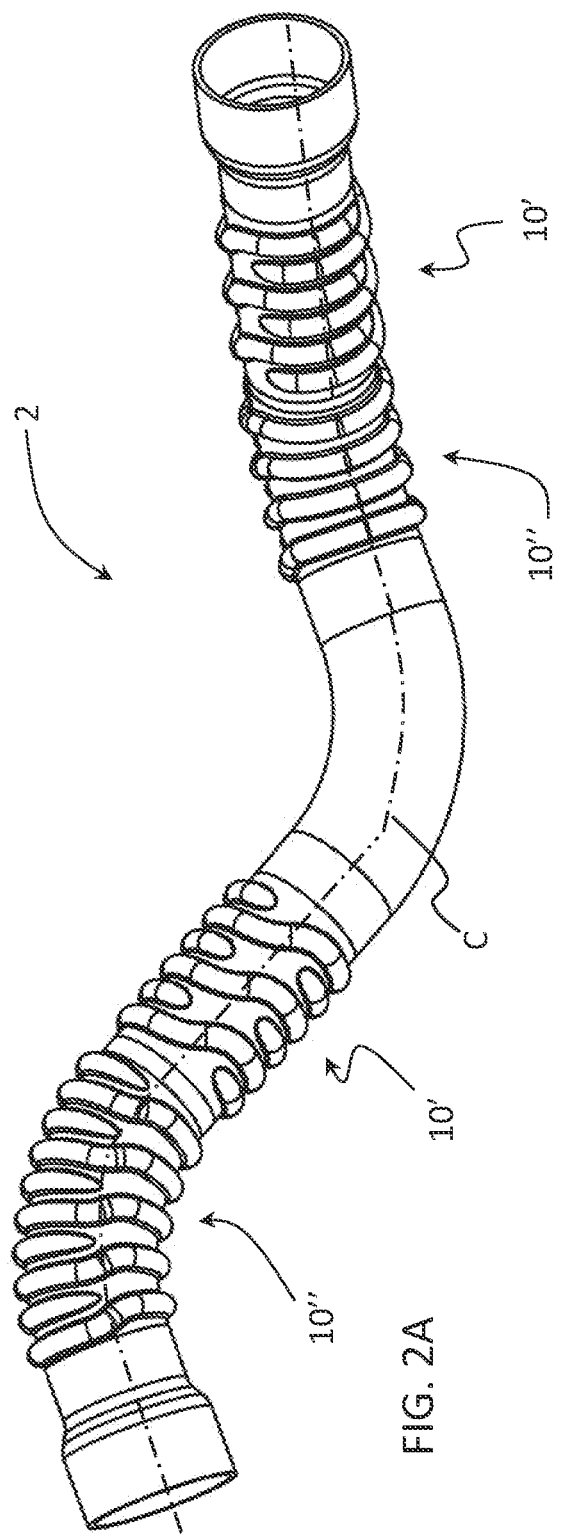
FIGS. 2A and 2B are perspective views of another example of a fluid duct according to an embodiment of the invention.
Figure 2B:
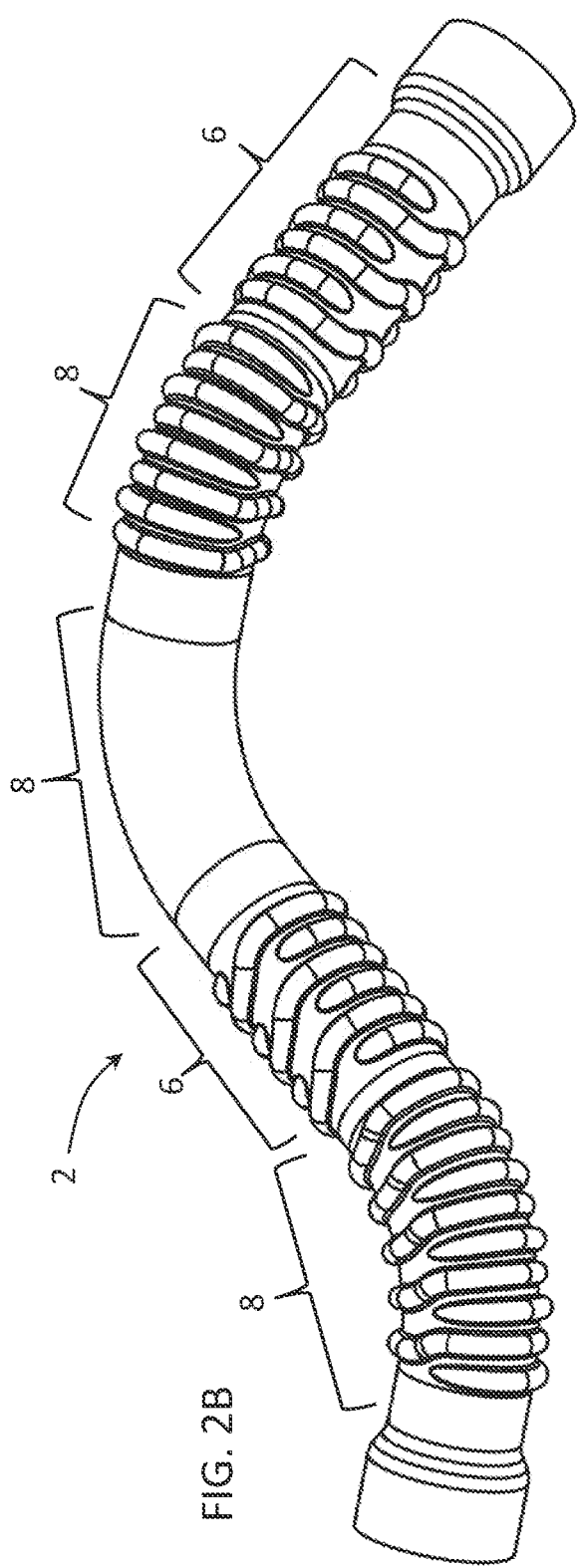

Referring now to the drawings, wherein like reference numerals designate corresponding structure throughout the views, and referring in particular to FIG. 1A, a fluid duct 2 according to embodiments of the invention comprises connection ends 4a, 4b for coupling to other components, for instance to an inlet and outlet of a gas flow system, such as for instance a gas flow system of a turbo charger in an automotive combustion engine. The fluid duct may however be used for other fluids in automotive applications and in non-automotive applications. The fluid duct may comprise straight sections 6 and/or bent sections 8. The shape of the fluid duct in FIGS. 1a to 2b is only for illustrative purposes, it being understood that the fluid duct may have a large variety of shapes, lengths, diameters, number of bent and straight sections, and moreover may incorporate functional or structural components, depending on the application.

Figure 4A:
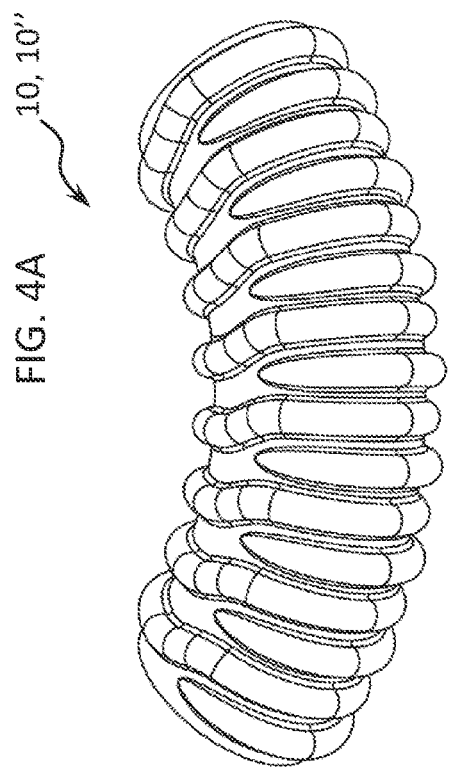
FIGS. 4A and 4B are perspective views of a bent section of a bellows of a fluid duct according to an embodiment of the invention.
Figure 4B:
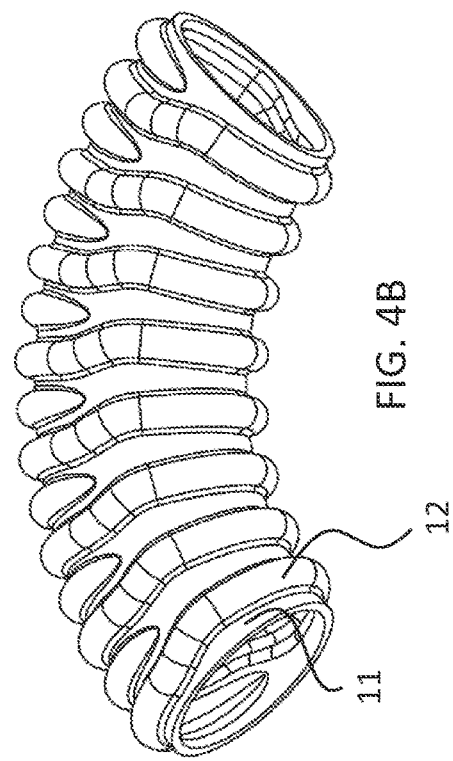
Figure 4D:
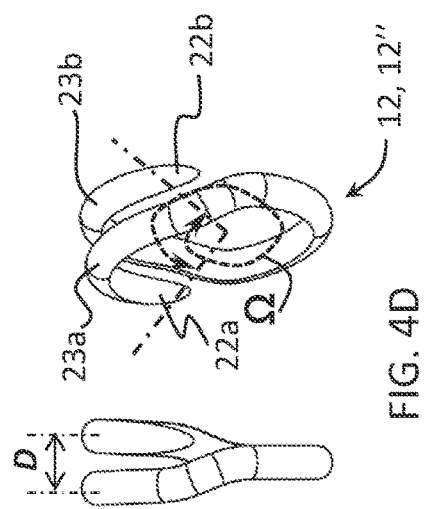
FIG. 4D illustrates the shape of a convolute of the bellows of FIGS. 4A to 4C.
Figure 4C:
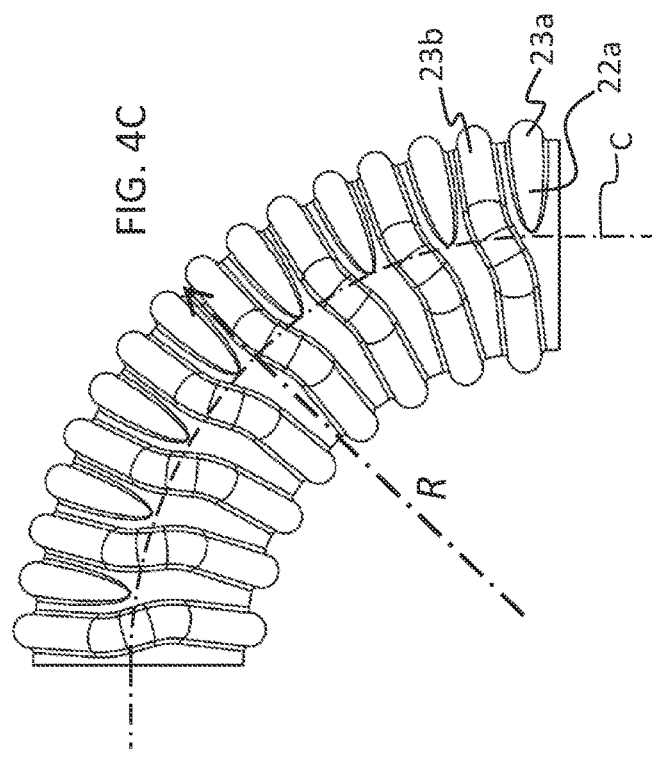
FIG. 4C is a plan view of the embodiment of FIGS. 4A and 4B.
Figure 5A:
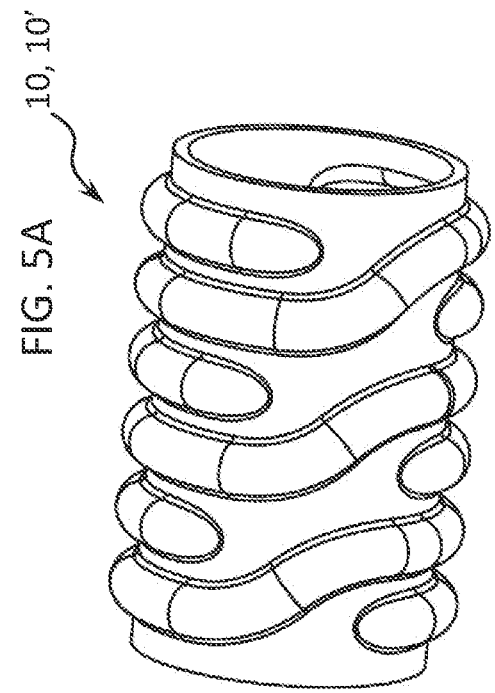
FIGS. 5A to 5D are similar to FIGS. 3A to 3D, showing another embodiment of the invention.
Figure 5D:
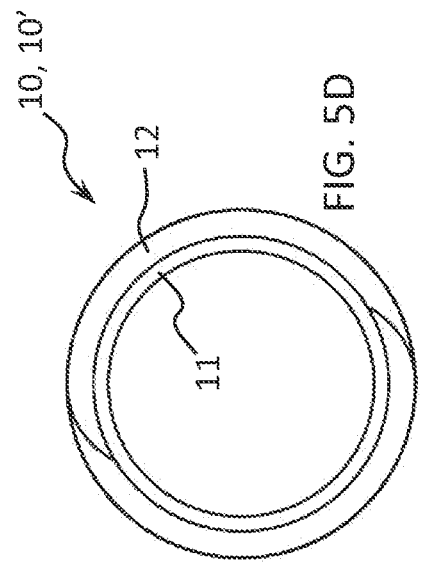
Figure 5B:
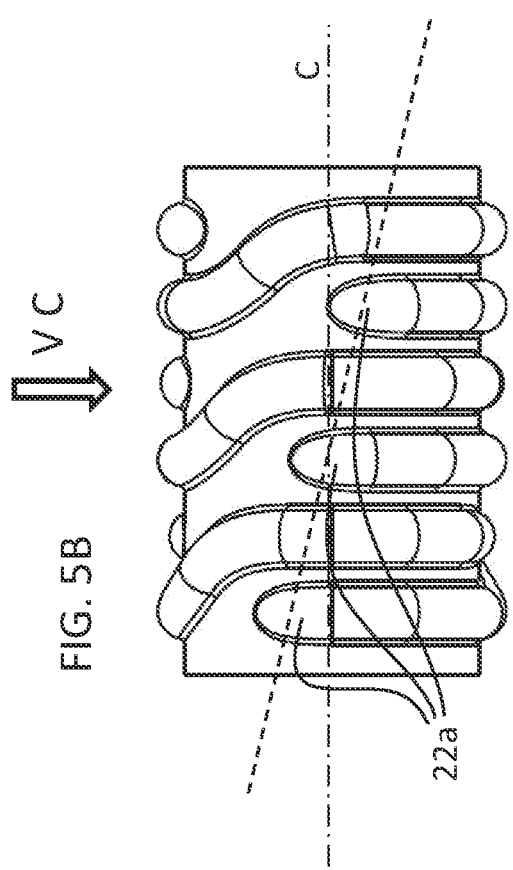
Figure 5C:
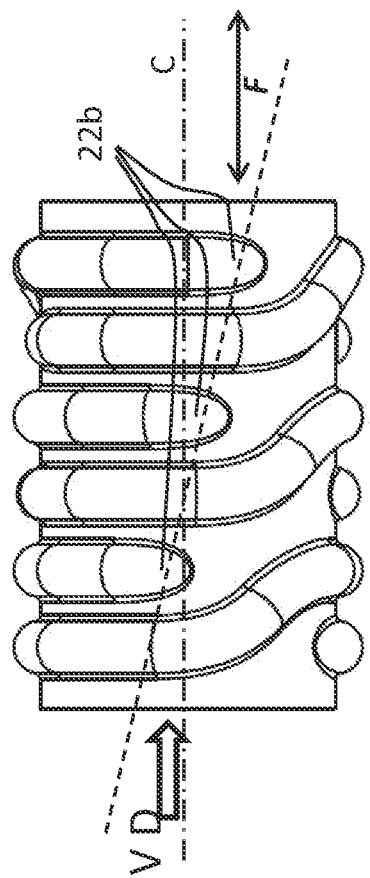
Figure 7A:
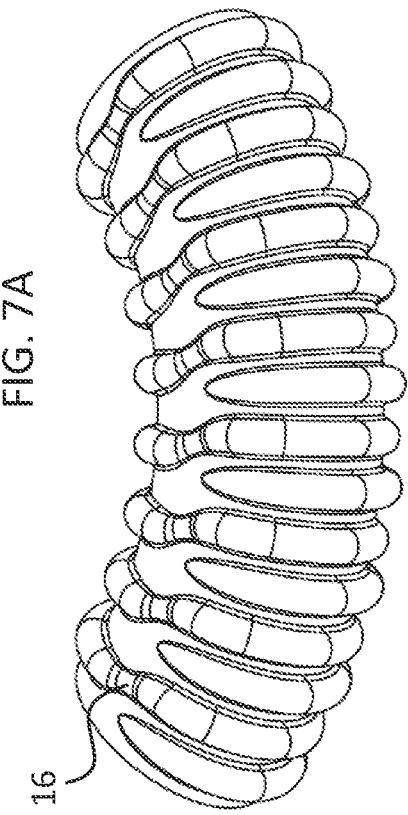
FIGS. 7A to 7D are similar to FIGS. 4A to 4D, showing yet another embodiment of the invention.

The fluid duct 2 defines a duct channel therein for guiding flow of a fluid, and comprises at least one bellows 10, or a plurality of bellows 10 interconnected by non-bellow portions 9. The non-bellows portions may for instance comprise generally cylindrical tubular portions. The bellows 10 may include bent bellows 10", for instance as illustrated in FIGS. 2A, 2B, 4A to 4D and 7A to 7A, or straight bellows 10', for example as illustrated in FIGS. 2A, 2B, 3A to 3D, 5A to 5D and 6A to 6D.

The bellows 10 according to embodiments of the invention comprise a plurality of convolutes 12 formed on a tubular base wall 11 of the fluid duct. The convolutes 12 and the tubular base wall 11 wrap around the duct channel. The tubular base wall 11 may be cylindrical or substantially cylindrical, as shown in the illustrated embodiments, although in alternative embodiments the tubular base wall 11 may have non-cylindrical shapes, such as, without limitation, oval (e.g. elliptical), polygonal, or irregular shapes.

In the illustrated embodiments, the convolutes 12 comprise a profile 14, as viewed in orthogonal cross-section to the wrap-around direction of the convolute 12, that is convex and curved or rounded, for instance comprising a generally cylindrical convex profile 14 upstanding radially outwardly from the tubular base wall 11.

It may however be noted that within the scope of the invention, convolutes 12 of the bellows 10 may have concave profiles 14 that project radially inwardly from the tubular base wall 11. It is also possible to provide bellows 10 that have convolutes 12 that are both convex and concave either within a same bellows 10, or for different bellows of a plurality of bellows of the fluid duct 2.

Moreover, within the scope of the invention, the profile 14 of the convolute may have shapes other than cylindrical, for example and without limitation elliptical, triangular, parabolic, and various other profiles.

Moreover, within the scope of the invention, the convolutes 12 of a bellows 10 or the convolutes 12 of different bellows 10 of the fluid duct 2 may have essentially identical or different profiles 14.

The fluid duct 2 of the embodiments illustrated in FIGS. 1A to 2B is shown as a fluid duct with an essentially constant tubular base wall diameter, except for the connection ends 4a, 4b, however within the scope of the invention the tubular base wall 11 may also have varying diameters along the fluid duct 2 and may also comprise additional sections that merge together such as found in a "Y" shaped fluid duct section.

The flexibility of the overall fluid duct 2 may be important to allow easy assembly and coupling of the connection ends 4a to 4b to external components. In automotive applications, the fluid duct 2 is often positioned in an engine compartment that has very compact spacing between components, providing difficult access for assembly and disassembly of the fluid duct 2. Overall flexibility of the fluid duct 2 in a large range of rotation angles about the duct centerline C is important. In a fluid duct 2 provided with a plurality of bellows 10 as illustrated for instance in the embodiments of FIGS. 1A, 1B and 2A, 2B, each one of the plurality of the bellows 10 contributes to the overall bending flexibility of the fluid duct 2 between the coupling ends 4a, 4b. If each of the bellows 10 has a large bending flexibility at different rotation angles about the centerline C, the overall flexibility of fluid duct 2 is also improved.

According to the invention, the convolutes 12 of the bellows 10 are non-continuous in the sense that they extend from a first end 22a to a second end 22b that are not connected together, whereby the convolutes 12 have a general spiral shape that wraps around the duct channel by an angle Ω between 180° and 720°, and the first and second ends 22a, 22b are offset in the flow direction F by a non-zero axial offset D. See, for example, FIG. 3C. The wrap around angle Ω defined herein is measured as a flat plane projection of the angle.

The general spiral shape and wrap-around angle Ω between 180° and 720° of each of the plurality of convolutes 12 advantageously provides a large bending flexibility in a large range of angles around the centerline C, yet ensures a high stiffness against elongation in the flow direction F (parallel to the centerline C) because of the continuous path of the tube base wall 11 between successive adjacent convolutes 12. Since each convolute 12 is non-continuous, the elongation of a convolute 12 in the flow direction F is restricted by the inter-joining tubular base wall portions 11.

In certain embodiments, as illustrated in FIGS. 3A to 3F, FIGS. 5A to 5D, and FIGS. 6A to 6D, each convolute 12 wraps around the duct channel by an angle Ω greater than 180° and less than 360°, preferably in a range of 200° to 340°. The convolutes are arranged in interleaving pairs 12', 12", whereby the adjacent convolutes of a pair have general spiral shapes with opposing angles (i.e. wind in opposite directions) such that the two convolutes 12', 12" interleave, as best illustrated in FIGS. 3E and 3F.

Figure 7B:
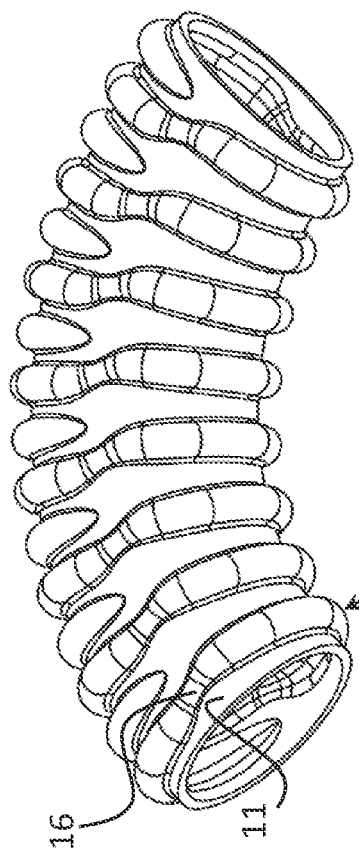
Figure 7D:
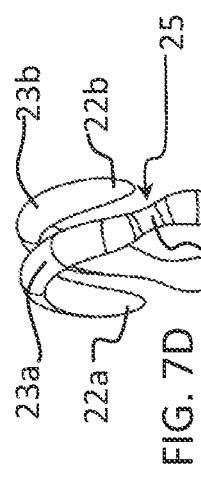
Figure 7C:
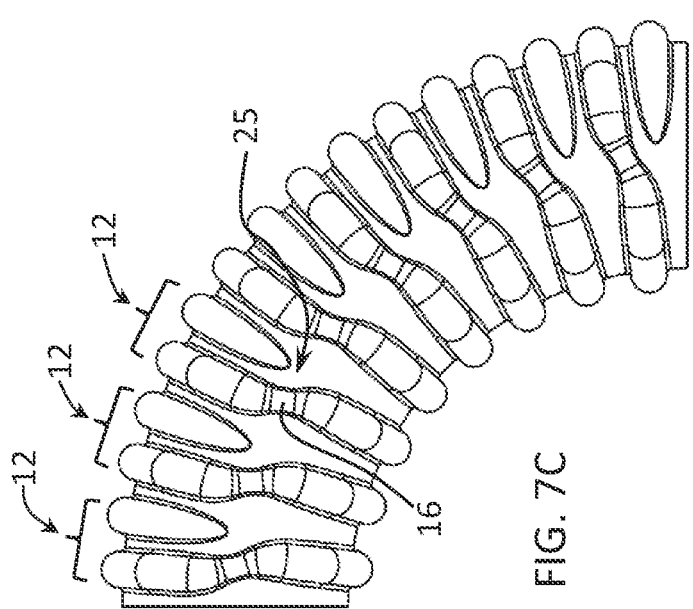

In embodiments of bellows 10 illustrated in FIGS. 4A through 4D and 7A through 7D, the convolutes 12 wrap around the duct channel by an angle Ω greater than 360° and less than 600° such that the end portions 23a, 23b overlap each other on the circumference of the tube wall 11. Each convolute 12 has a wrap-around angle Ω that is preferably in a range of 380° to 560°. The bellows 10 illustrated in these Figures are provided on a curved fluid duct 2 forming a bend, wherein the overlapping sections 23a, 23b of the convolutes 12 are provided on an outer radius R of the tube base wall 11.

The interleaving pair of convolutes 12 that wrap around the duct channel by an angle Ω of less than 360° are particularly well adapted for straight or almost straight sections of tube, whereas bellows 10 with convolutes 12 wrapping around the tube by an angle Ω of more than 360° are well adapted for bent sections of the fluid duct 2, although both convolute variants may be used in bent or straight sections while providing the advantages according to this invention of enhanced bending flexibility in a wide rotation angle around the centerline C and high stiffness against elongation in the flow direction F substantially parallel to the centerline C.

In the embodiments of FIGS. 3A to 3D, 4A through 4D and 5A through 5D, and as depicted with particularity in FIG. 3C, the profile 14 of each convolute 12 has a substantially constant radial height H from the tube base wall 11 and a substantially constant axial width W. In order to provide the axial offset D, the convolute 12 may be provided with one or more S-shaped curved portions 25. The remaining sections of the convolute 12 may extend in a plane substantially orthogonal to the centerline C, or may be inclined at a slight angle with respect to a plane orthogonal to the centerline C to reduce or eliminate the curvature of the S bend 25.

In certain variants, the S-bend 25 may be provided with a narrow tapered section 16, as depicted, for example, in FIG. 6C. The narrow tapered section 16 has an axial width W' that is smaller than the axial width W of the other portions of the convolute 12, and/or a radial height H' that is smaller than the radial height H of the other portions of the convolute 12, as depicted, for example, in FIG. 6D. This provides slightly greater stiffness that prevents or reduces elongation in the flow direction F and also allows for a reduction in the axial offset D between the overlapping end portions 23a, 23b of convolutes 12. Axial offset D is as depicted, for example, in FIG. 4D. A more compact arrangement of adjacent convolutes 12 can thus be provided in this variant to increase bending flexibility without substantially reducing elongation stiffness.

In a bellows section 10, the ends 22a, 22b of adjacent convolutes 12 may be substantially aligned with each other in the direction parallel to the centerline C as for instance illustrated in embodiments 6A to 6C and 3A to 3D. In a variant, as illustrated in FIGS. 5A to 5D, the convolutes 12 are rotated with respect to each other around the centerline C such that the ends 22a, 22b are aligned with a virtual line that twists (i.e. winds) around the duct channel. The rotation of the successive convolutes 12 can be used advantageously to change the bending angle flexibility of the fluid duct 2 and/or to follow a two- or three-dimensional bending curve in the duct, such that the overlapping ends of the convolutes 12 remain on an outer radius R of the tubular base wall 11.

In another advantageous embodiment, the fluid duct 2 is made of a polymer, preferably a thermoplastic polymer, such as polyamide (aliphatic, semiaromatic, blends), polyester (e.g. polybutylene terephthalate, polyethylene terephthalate, copolyesters, copolyetheresters, blends), polyacetal, polyolefins (e.g. polypropylene, polyethylene), thermoplastic vulcanisates and mixtures and blends of any of these. Rubbers may also be used, such as ethylene propylene diene elastomer (EPDM) and acrylate rubbers. The air duct may be formed by any suitable manufacturing method, including, for example and without limitation, blow-molding or other molding, injection molding or extrusion (e.g., corrugated extrusion). The fluid duct 2 may be made of a homogeneous material or may be formed of composite materials, for instance including fiber reinforced polymers. It may be made using a multi-layer coextruded combination, such as metal and/or fabric reinforcing and/or barrier layers coextruded with a polymer layer or layers.

The fluid duct 2 may be used as a conduit for gases, such as air, exhaust and fuel/air dispersions. It may also be used for liquids, such as coolants, fuel, transmission liquids and brake liquids.

While certain of the preferred embodiments of the present invention have been described and specifically exemplified above, it is not intended that the invention be limited to such embodiments. Rather, it is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

LIST OF REFERENCES IN THE DRAWINGS airflow system (e.g. automotive)
   fluid duct 2
   (gas duct)
      Connection ends 4a, 4b
      Straight section 6
      Bent section 8
      Non-bellows tube portions 9
      Bellows 10
         Bent bellows 10'
         Straight bellows 10"
         Tubular base wall 11
         Convolute (non-continuous) 12
            Interleaved convolute pair 12', 12"
            Profile 14
            Convex profile
            Curved profile
            Cylindrical profile
            Narrowing taper 16
            Ends 22a, 22b
            Axial offset D
            End portions 23a, 23b
   Convolute profile axial width W
   Convolute profile radial height H
      Narrow section axial width W', radial height H'
   Convolute wrap-around angle $\Omega$
   centerline C
   flow direction F (axial direction)

The invention claimed is:

1. A fluid duct (2) comprising a tubular base wall (11) surrounding a duct channel and at least one bellows (10) formed along a section of the tubular base wall (11), the bellows (10) comprising a plurality of convolutes (12) having a profile (14) projecting radially from the tubular base wall (11), wherein at least one of said plurality of convolutes (12) wraps around the duct channel with a wrap-around angle $\Omega$ of between 180° and 360° measured from a first end (22a) to a second end (22b) the vertex of the wrap-around angle $\Omega$ at a centerline C of the duct channel, said second end (22b) being offset in a flow direction F parallel to the centerline C of the duct channel by a non-zero offset distance D from the first end, said convolutes (12) being arranged in pairs that interleave such that the convolutes (12) of the pair wind around the duct channel in opposite winding directions.

2. The fluid duct 2 according to claim 1, wherein the at least one bellows (10) comprises at least two bellows (10), wherein the at least two bellows (10) are interconnected by at least one non-bellows tube portion (6).

3. The fluid duct according to claim 1, wherein the wrap-around angle $\Omega$ is in a range of 200° to 340°.

4. The fluid duct according to claim 1, wherein said at least one bellows (10) comprising interleaving pairs of convolutes (12) is on a straight or substantially straight section (9) of fluid duct (2).

5. The fluid duct according to claim 1, wherein said convolutes (12) of said at least one bellows (10) are provided in a juxtaposed manner.

6. The fluid duct according to claim 5, wherein ends (23a, 23b) of the juxtaposed convolutes (12) are substantially aligned along a virtual line that is substantially parallel to the centerline C of the duct channel.

7. The fluid duct according to claim 1, wherein the convolutes (12) are each provided with at least one narrowing taper (16) having an axial width W' that is smaller than a width W of a non-narrowed, non-tapered portion of the convolute (12); a radial height H' that is smaller than a radial height H of a non-narrowed, non-tapered portion of the convolute (12); or wherein W' and H' are smaller than W and H, respectively.

8. The fluid duct according to claim 7, wherein the narrowing taper (16) is arranged in an oblique section of the convolute (12).

9. The fluid duct according to claim 7, wherein the narrowing taper (16) is provided midway between ends (22a, 22b) of the convolute (12).

10. The fluid duct according to claim 7, wherein the narrowing taper (16) is provided adjacent to an end (22a, 22b) of the convolute (12).

11. The fluid duct according to claim 1, wherein the profile (14) of said convolutes (12) is convex and protrudes radially outwardly from the tubular base wall (11).

12. The fluid duct according to claim 1, for use as a fluid duct in an automotive engine compartment.

13. The fluid duct according to claim 1, wherein the fluid duct (2) is a blow molded or extruded polymer component.

\* \* \* \* \*